(12) United States Patent
Creech et al.

(10) Patent No.: US 11,486,417 B2
(45) Date of Patent: Nov. 1, 2022

(54) ACTUATOR ASSEMBLY

(71) Applicant: Dana Heavy Vehicle Systems Group, LLC, Maumee, OH (US)

(72) Inventors: Michael Z. Creech, Maumee, OH (US); Timothy J. Wills, Maumee, OH (US)

(73) Assignee: Dana Heavy Vehicle Systems Group, LLC, Maurnee, OH (US)

( * ) Notice: Subject to any disclaimer, the term of this patent is extended or adjusted under 35 U.S.C. 154(b) by 0 days.

(21) Appl. No.: 17/422,792

(22) PCT Filed: Jan. 16, 2019

(86) PCT No.: PCT/US2019/013766
§ 371 (c)(1),
(2) Date: Jul. 14, 2021

(87) PCT Pub. No.: WO2020/149838
PCT Pub. Date: Jul. 23, 2020

(65) Prior Publication Data
US 2022/0128068 A1    Apr. 28, 2022

(51) Int. Cl.
| | |
|---|---|
| *F15B 11/12* | (2006.01) |
| *B60K 17/346* | (2006.01) |
| *F15B 15/14* | (2006.01) |
| *F16H 48/32* | (2012.01) |

(52) U.S. Cl.
CPC ........ *F15B 11/122* (2013.01); *B60K 17/3462* (2013.01); *F15B 15/1452* (2013.01); *F16H 48/32* (2013.01)

(58) Field of Classification Search
CPC ........ F15B 11/122; F15B 11/121; F15B 11/12
See application file for complete search history.

(56) References Cited

U.S. PATENT DOCUMENTS

| | | |
|---|---|---|
| 5,125,326 A | 6/1992 | Sarcona |
| 2003/0136254 A1 | 7/2003 | Hirano et al. |
| 2012/0144945 A1* | 6/2012 | Bai ........................ F16H 61/30 |
| | | 74/473.11 |

FOREIGN PATENT DOCUMENTS

| | | |
|---|---|---|
| EP | 2843267 A1 | 3/2015 |
| FR | 801618 A | 8/1936 |

OTHER PUBLICATIONS

European Patent Office, International Search Report with Written Opinion in Application No. PCT/US2019/013766, dated Sep. 13, 2019, 10 pages, Rijswijk, Netherlands.

* cited by examiner

*Primary Examiner* — Thomas E Lazo
(74) *Attorney, Agent, or Firm* — McCoy Russell LLP

(57) ABSTRACT

An actuator assembly comprises a housing having a piston at least partially disposed therein. The actuator assembly includes at least one biasing mechanism disposed within the housing to selectively position the piston between a first position, a second position, and a third position located between the first and second positions.

20 Claims, 6 Drawing Sheets

ACTUATOR ASSEMBLY

CROSS REFERENCE TO RELATED APPLICATION

The present application claims the benefit of PCT Patent Application No. PCT/US2019/013766, filed on Jan. 16, 2019, the entire disclosure of which is hereby incorporated by reference.

FIELD

This present disclosure relates to an actuator assembly, and more particularly, to an actuator assembly having a multi-positional actuator.

BACKGROUND

Conventionally, an actuator assembly is used to mechanically engage or disengage a working part from another working part. One type of actuator assembly includes a three-position actuator. The three-position actuator is capable of achieving the typical engaged position and disengaged position, along with an intermediate position between the engaged and disengaged positions. Such actuator assemblies employ solenoids and motors to position the actuator. However, the solenoids and motors are substantially large in size, and not conducive to packaging in a vehicle.

Accordingly, it would be desirable to provide an apparatus that overcomes the deficiencies of the known designs.

SUMMARY

In concordance and agreement with the present disclosure, an actuator assembly includes a piston and at least one biasing mechanism having a compact arrangement. Such compact arrangement of the actuator assembly can improve a fuel efficiency of the vehicle, enhance a capacity of a passenger compartment, and increase a capacity of a battery compartment. Additionally, the actuator assembly of the present disclosure reduces an energy consumption per unit mass of the vehicle.

In one embodiment, an actuator assembly, comprises: a housing having a center bore formed therein; a first biasing mechanism disposed in the housing; a second biasing mechanism disposed in the housing; and a solid piston at least partially disposed in the housing, wherein the piston includes a first end and a second end, and is selectively positionable between a first position, a second position, and an intermediate position between the first position and the second position, and wherein the first end of the piston contacts the first biasing mechanism when the piston is in the first position, and the second end of the piston includes an actuating member extending outwardly away from the first biasing mechanism, wherein the piston is spaced apart from the first biasing mechanism when the piston is in at least one of the second position and the intermediate position, and wherein the second end of the piston contacts the second biasing mechanism when the piston is in the first position, the second position, and the intermediate position.

In another embodiment, an actuator assembly comprises: a housing; a one-piece solid piston at least partially disposed in the housing, wherein the piston divides the housing into a first chamber and a second chamber, and wherein the first chamber has a first biasing mechanism disposed therein and the second chamber has a second biasing mechanism disposed therein; and a sealing member disposed about the piston, wherein the sealing member militates against a flow of at least one fluid directly from one of the first chamber and the second chamber into a remaining one of the first chamber and the second chamber.

In yet another embodiment, an actuator assembly comprises: a housing; and a one-piece solid piston at least partially disposed in the housing, wherein the piston divides the housing into only two chambers, and wherein each of the chambers has a biasing mechanism disposed therein.

In certain aspects of the present disclosure, the first biasing mechanism includes a biasing element and a movable member.

In certain aspects of the present disclosure, at least a portion of the first biasing mechanism is disposed about a stem portion formed within the housing.

In certain aspects of the present disclosure, the movable member of the first biasing mechanism is a generally disc-shaped.

In certain aspects of the present disclosure, the actuator assembly further comprises an abutment configured to perform as a linear stop against which the movable member abuts when the piston is not in engagement therewith.

In certain aspects of the present disclosure, the abutment is disposed on a stem portion formed within the housing.

In certain aspects of the present disclosure, the second end of the piston contacts the second biasing mechanism when in at least one of the first position, the second position, and the intermediate position.

In certain aspects of the present disclosure, a biasing force of the first biasing mechanism is greater than a biasing force of the second biasing mechanism.

In certain aspects of the present disclosure, the center bore includes a first cavity and a second cavity formed therein.

In certain aspects of the present disclosure, a diameter of the first cavity is larger than a diameter of the second cavity forming a shoulder therebetween.

In certain aspects of the present disclosure, the shoulder is an abutment configured to perform as a linear stop against which at least a portion of the first biasing mechanism abuts when the piston is not in engagement therewith.

In certain aspects of the present disclosure, the piston divides the housing into a pair of substantially fluid-tight chambers.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teaching of the present disclosure. However, the drawings do not illustrate all possible implementations of the presently disclosed subject matter, and are not intended to limit the scope of the present disclosure in any way.

DETAILED DESCRIPTION

Figure 1A:
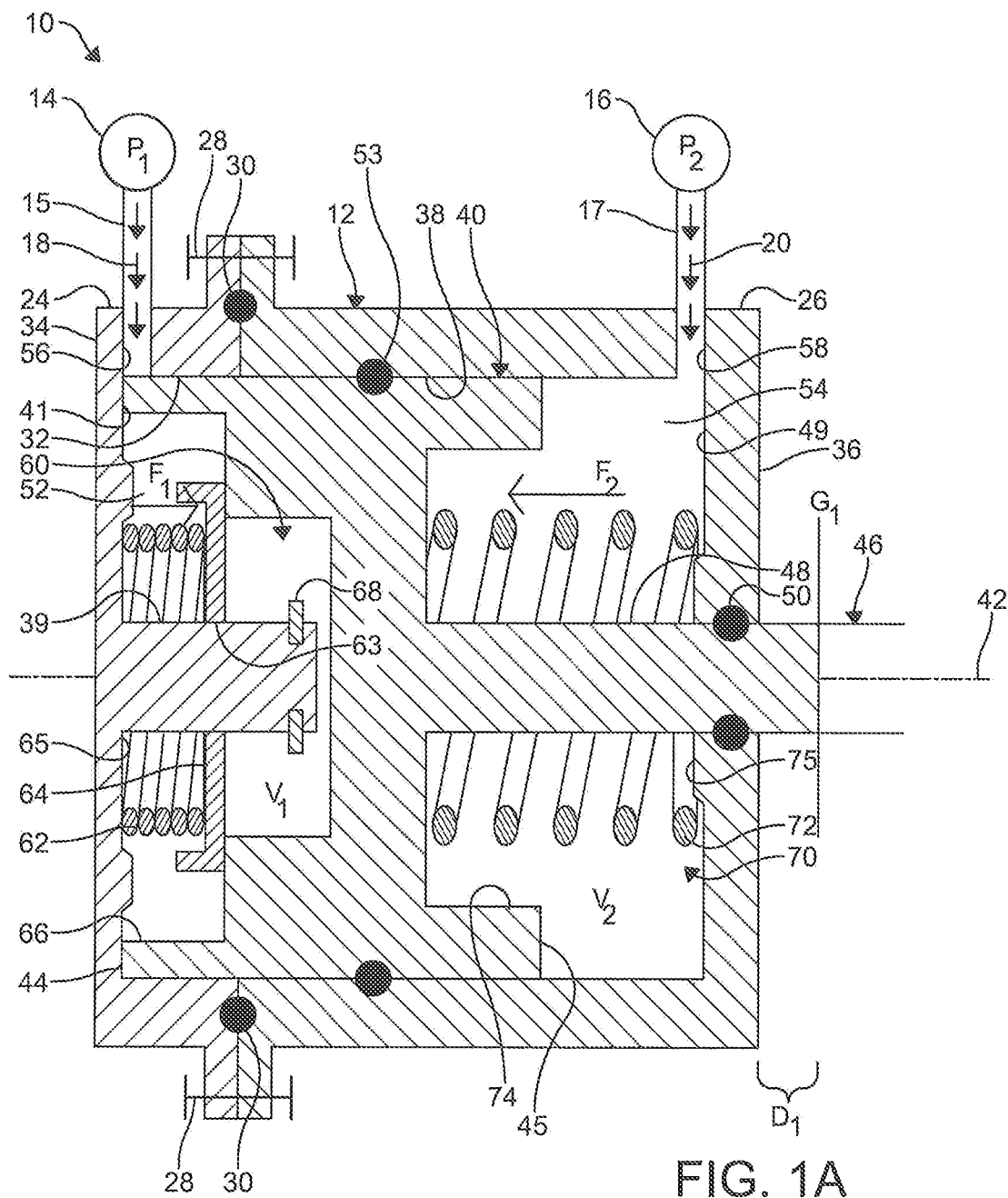
FIG. 1A is a schematic section view of an actuator assembly according to an embodiment of the present disclosure, showing an actuator of the actuator assembly in a first position.

It is to be understood that the present disclosure may assume various alternative orientations and step sequences, except where expressly specified to the contrary. It is also to be understood that the specific assemblies and processes illustrated in the attached drawings, and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Embodiments of an actuator assembly 10 are described below. In certain embodiments, the actuator assembly 10 is utilized in an axle disconnect assembly (not depicted) for a vehicle (not depicted), where the actuator assembly 10 engages a collar to selectively engage and disengage a driving connection of input and output shafts of the vehicle. The actuator assembly 10 may have applications in commercial vehicles, both light duty and heavy duty vehicles, and for passenger, off-highway, and sport utility vehicles. Additionally, the actuator assembly 10 described herein may be adapted for use in front and/or rear driving axles, and in steerable and non-steerable axles. It would be understood by one of ordinary skill in the art that the actuator assembly 10 also has non-automotive application such as industrial, locomotive, military, agricultural, and aerospace applications, for example.

Figure 1B:
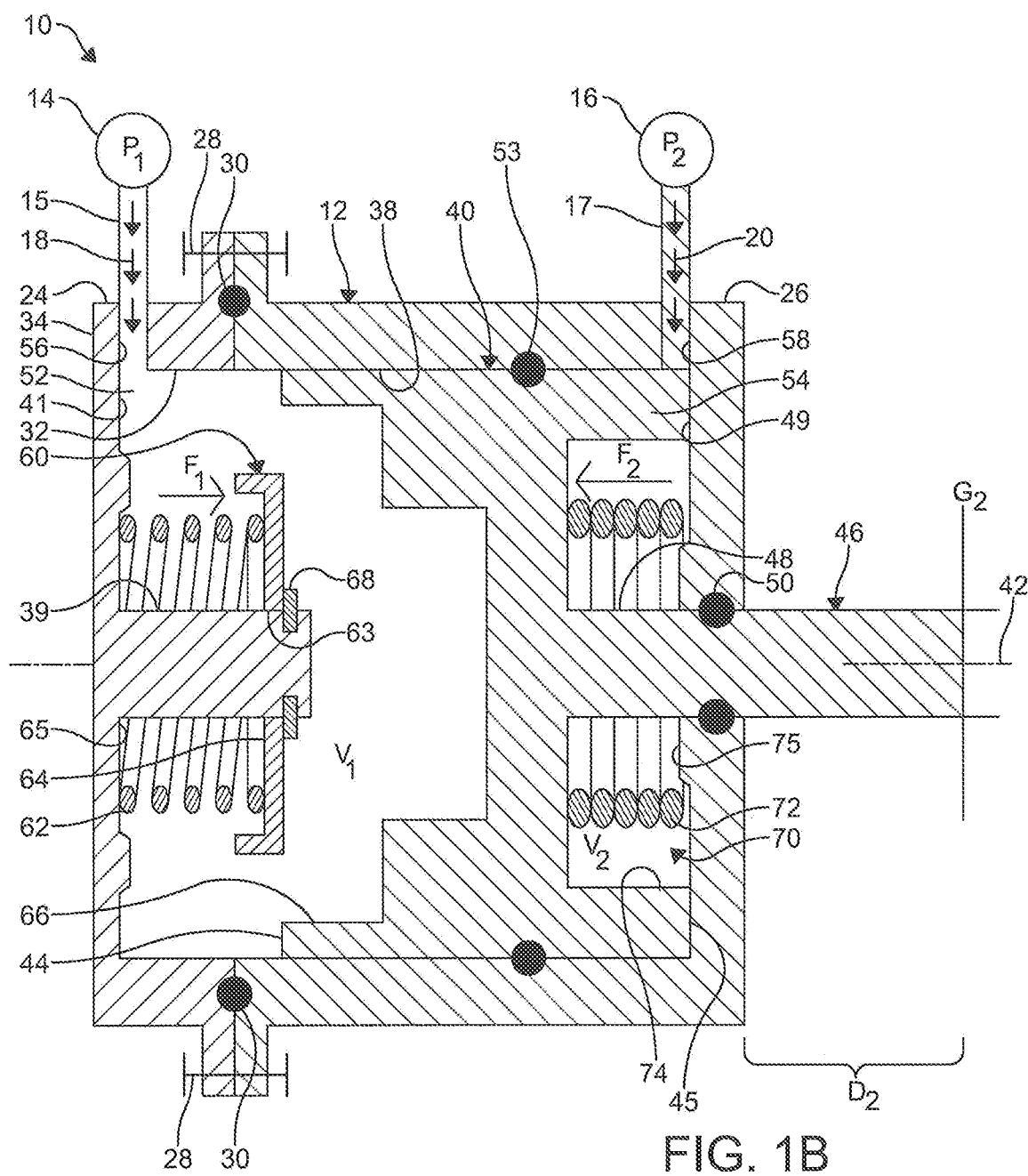
FIG. 1B is a schematic section view of the actuator assembly of FIG. 1A, showing the actuator of the actuator assembly in a second position.
Figure 1C:
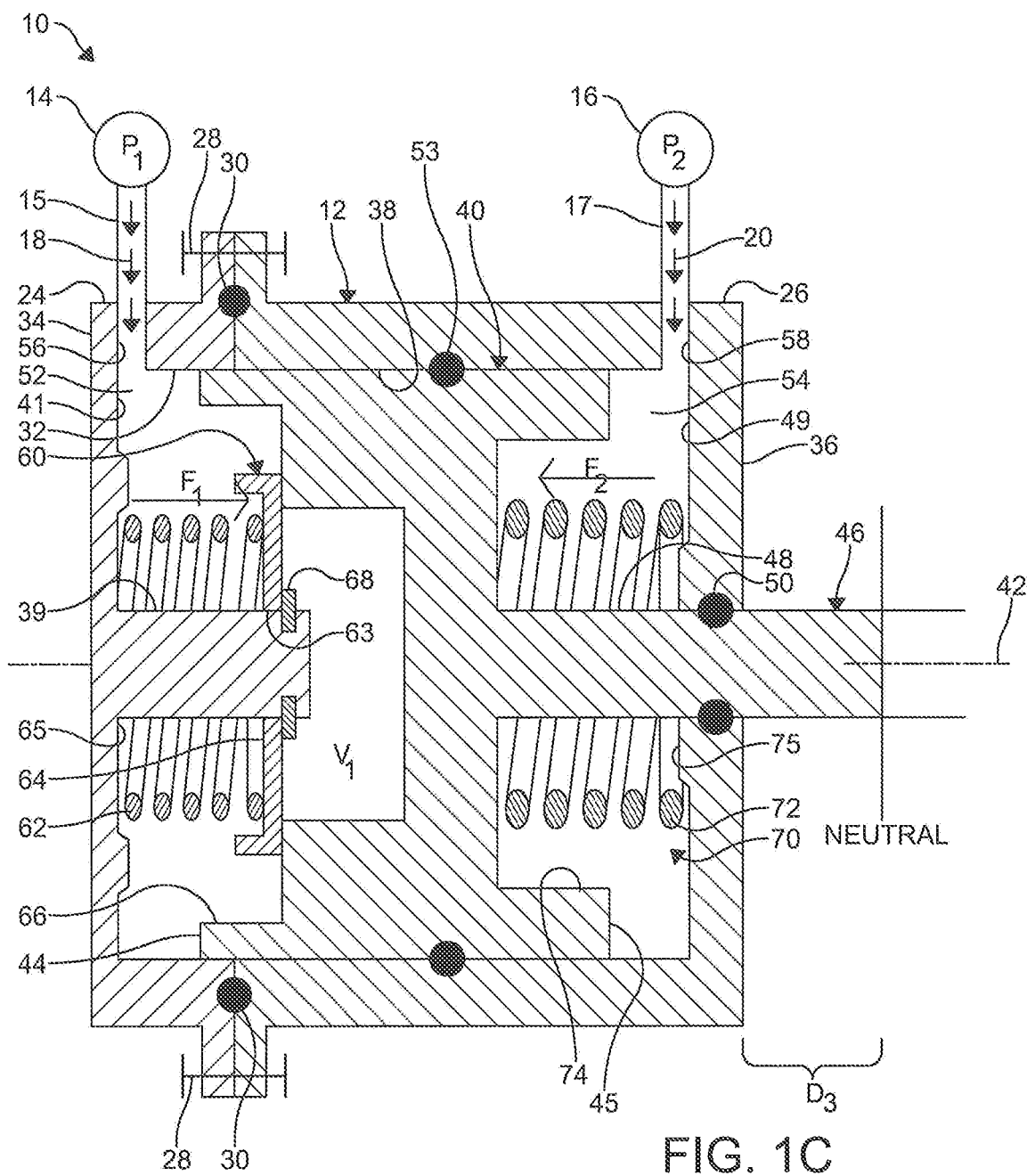
FIG. 1C is a schematic section view of the actuator assembly of FIGS. 1A-1B, showing the actuator of the actuator assembly in an intermediate third position between the first position and the second position thereof.

In an embodiment illustrated in FIGS. 1A-1C, the actuator assembly 10 includes a generally cylindrical housing 12. The housing 12 is in fluid communication with a first fluid source 14 through a passage way 15 formed therein. Similarly, the housing 12 is in fluid communication with a second fluid source 16 through a passageway 17 formed therein. The housing 12 is configured to receive a pressurized first fluid 18 from the first fluid source 14 and a pressurized second fluid 20 from the second fluid source 16 therein. The first fluid 18 has a pressure $P_1$ and the second fluid has a pressure $P_2$. It is understood that the first and second fluids 18, 20 can be any type of fluid as desired such as air, oil, and the like, for example. It is further understood that the first and second fluids 18, 20 can be the same or different types of fluid if desired.

As shown, the housing 12 may be formed from a first housing portion 24 coupled with a second housing portion 26. Various methods of coupling the housing portions 24, 26 together can be employed, if desired. For example, the housing portions 24, 26 can be coupled together by mechanical fasteners 28 (e.g. screws, nuts and bolts, rivets, etc.), liquid fasteners (e.g. epoxy, etc.), a joining or coupling process (e.g. welding), and the like. At least one sealing member 30 may be disposed between the housing portions 24, 26 to militate against leakage of the first and second fluids 18, 20 from the housing 12. Various types of sealing members may be employed for the at least one sealing member 30 as desired such as an O-ring, and the like, for example.

A center bore 32 is formed in the housing 12 extending axially from a first end 34 of the housing 12 to a second end 36 thereof. In certain embodiments, the first end 34 of the housing 12 has a first axial inner surface 41, and the second end 36 of the housing 12 has a second axial inner surface 49. The center bore 32 shown has a generally uniform diameter and a substantially smooth radial inner surface 38. In certain embodiments, a stem portion 39 may extend outwardly from the first axial inner surface 41 of the first end 34 of the housing 12 into the center bore 32. Although the stem portion 39 shown has a generally cylindrical shape, it should be appreciated that the stem portion 39 can have any shape and size as desired.

A piston 40 is also at least partially disposed within the center bore 32 of the housing 12. The piston 40 includes a first end 44 and a second end 45. The piston 40 may be configured to linearly translate within the center bore 32 along a working-axis 42. In an embodiment, the piston 40 is configured to linearly translate among a first position, a second position, and an intermediate third position between the first and second positions, as sequentially demonstrated in FIGS. 1A-1C. In certain applications, the piston 40 is configured to linearly translate within the center bore 32 to achieve desired gear range selections of a vehicle, where the first position of the piston 40 corresponds to a gear $G_1$ (e.g. one of a low gear and a high gear), the second position of the piston 40 corresponds a gear $G_2$ (e.g. a remaining one of the low and high gears), and the intermediate third position corresponds to a neutral operation of the vehicle.

As illustrated in FIG. 1A, the first end 44 of the piston 40 abuts the first axial inner surface 41 of the first end 34 of the housing 12 when the piston 40 is in the first position. On the contrary, the second end 45 of the piston 40 abuts the second axial inner surface 49 of the housing 12 when the piston 40 is in the second position shown in FIG. 1B.

The piston 40 may be coupled with an actuator 46 either directly, or through one or more intermediate components. In the embodiment shown, the piston 40 includes an actuating member 48 to facilitate coupling to the actuator 46. The actuating member 48 may extend axially outwardly from the second end 45 of the piston 40 through the second housing portion 26 and may be configured to interface with one or more external systems. In certain applications, the actuating member 48 is coupled to a transfer case gear controller (not depicted) to select a desired one of the gears $G_1$, $G_2$ (e.g. one of the low and high gears) or the neutral operation of the vehicle. As illustrated, at least one sealing member 50 is interposed between the actuating member 48 and the second housing portion 26 to militate against leakage of the first and second fluids 18, 20 from the housing 12. Various types of sealing members may be employed for the at least one sealing member 50 as desired such as an O-ring, and the like, for example.

In certain embodiments, an extension of the actuating member 48 from the housing 12 may vary based on the position of the piston 40. For example, as shown in FIG. 1A, when the piston 40 is the first position along the working-axis 42, the actuating member 48 may extend a first distance $D_1$ from the housing 12. Likewise, when the piston 40 moves to the second position or the third position along the working-axis 42, as respectively and sequentially shown by FIGS. 1B and 1C, the extension of the actuating member 48 from the housing 12 may correspondingly increase to a second distance $D_2$ and a third distance $D_3$.

As more clearly illustrated in FIG. 1C, the piston 40 may divide the center bore 32 into a first chamber 52 and a second chamber 54 within the housing 12. At least one sealing member 53 is disposed between an outer surface of the piston 40 and the radial inner surface 38 of the housing 12 to militate against leakage of the first fluid 18 from the first chamber 52 into the second chamber 54, and leakage of the second fluid 20 from the second chamber 20 into the first chamber 52. Various types of sealing members may be employed for the at least one sealing member 53 as desired such as an O-ring, and the like, for example.

In certain embodiments, a volume $V_1$ of the first chamber 52 and a volume $V_2$ of the second chamber 54 are dependent upon the position of piston 40 in the housing 12. As illustrated in FIG. 1A, the volume $V_1$ of the first chamber 52 may decrease and the volume $V_2$ of the second chamber 54 may increase as the piston 40 translates towards the first position. Contrarily, the volume $V_1$ of the first chamber 52 may increase and the volume $V_2$ of the second chamber 54 may decrease as the piston 40 translates towards the second position as shown in FIG. 1B. The first chamber 52 is in fluid communication with the first fluid source 14 via an aperture 56 formed in the housing 12, which is fluidly connected to the passageway 15. Similarly, the second chamber 54 is in fluid communication with the second fluid source 16 via an aperture 58 formed in the housing 12, which is fluidly connected to the passageway 17. The apertures 56, 58 may allow the first and second fluids 18, 20, respectively, to controllably flow into or out of the first and second chambers 52, 54, respectively, in a manner that may be used to manipulate the position of the piston 40 along the working-axis 42.

The actuator assembly 10 may further include a first biasing mechanism 60 disposed in the first chamber 52 of the housing 12. The first biasing mechanism 60 is configured to engage the piston 40 while the piston 40 translates between the first position and the intermediate third position. In certain embodiments, the first biasing mechanism 60 includes a biasing element 62 (e.g. a spring, etc.) and a movable member 64. The biasing element 62 may be positioned between the first end 34 of the housing 12 and the movable member 64. As shown, the first end 34 of the housing 12 may include a seat 65 formed therein to receive the biasing element 62. The biasing element 62 may be pre-loaded with a predetermined biasing force $F_1$ that may cause the movable member 64 to be urged against the piston 40 while the piston 40 translates between the first position and the intermediate third position.

In certain embodiments, the movable member 64 is generally disc-shaped having a central aperture 63 formed therethrough. It is understood, however, that the movable member 64 can have any size and shape as desired. As shown, the movable member 64 is concentrically and slidably disposed about the stem portion 39 of the housing 12. The movable member 64 is configured to linearly translate along the working-axis 42 and may be received into a recess 66 formed in the first end 44 of the piston 40 to provide a substantially uniform surface to engage the piston 40 while the piston 40 translates between the first position and the intermediate third position.

In regards to the embodiment shown in FIGS. 1A-1C, an abutment 68 is disposed on an end of the stem portion 39 of the housing 12. The abutment 68 may be any type of a linear stop against which the movable member 64 abuts when the piston 40 is not in engagement therewith. For example, the abutment 68 may be an annular flange, at least one protuberance, and at least one projection extending radially outwardly from the stem portion 39. It is understood that the abutment 68 can be integrally formed with the housing 12 or be formed as a separate and distinct component, as shown, such as a snap ring, a washer, and the like, for example. As more clearly illustrated in FIGS. 1B-1C, the predetermined biasing force $F_1$ of the biasing element 62 also causes the movable member 64 to be urged against the abutment 68 while the piston 40 translates between the intermediate third position and the second position.

The actuator assembly 10 may further include a second biasing mechanism 70 disposed in the second chamber 54 of the housing 12. The second biasing mechanism 70 is configured to continuously engage the piston 40 while the piston 40 translates amongst the first, second, and intermediate third positions. In certain embodiments, the second biasing mechanism 70 includes a biasing element 72 (e.g. a spring, etc.). The biasing element 72 may be positioned between the second end 36 of the housing 12 and the second end 45 of the piston 40. As shown, one end of the biasing element 72 is configured to be received into a recess 74 formed in the second end 45 of the piston 40 and another end is configured to be disposed around a seat 75 extending outwardly from the second end 36 of the housing 12. The biasing element 72 may be pre-loaded with a predetermined biasing force $F_2$. In certain embodiments, the biasing force $F_2$ of the biasing element 72 is less than the biasing force $F_1$ of the biasing element 62. The biasing element 72 may cause the piston 40 to be urged against the movable member 64 while the piston 40 translates between the first position and the intermediate third position.

In operation, the piston 40 may be urged towards the first end 34 of the housing 12 and into the first position along the working-axis 42, as illustrated in FIG. 1A. In certain applications, the first position of the piston 40 is selected when an operator of the vehicle desires the gear $G_1$ (e.g. one of the low and high gears). The first position of the piston 40 is achieved by exhausting the first fluid 18 from and depressurizing the first chamber 52, while causing the second fluid 20 to flow into and pressurizing the second chamber 54. In an embodiment, a pressure difference between the exhausted first chamber 52 and the pressurized second chamber 54 will impart a net force on the piston 40 that overcomes any pre-loaded biasing force $F_1$ of the biasing element 62 disposed between the movable member 64 and the housing 12. As a result, the biasing element 62 of the first biasing mechanism 60 is caused to compress and the biasing element 72 of the second biasing mechanism 70 is caused to elongate. In an embodiment, the first end 44 of the piston 40 may contact the first axial inner surface 41 of the housing 12 to provide a hard linear stop at a first end of a range of linear translation. In certain embodiments, the first end 44 of the piston 40 may abut the first axial inner surface 41 of the housing 12 prior to the biasing element 62 reaching a maximum compression state.

As illustrated in FIG. 1B, the piston 40 may also be urged towards the second end 36 of the housing 12 and into the second position along the working-axis 42. In certain applications, the second position of the piston 40 is selected when the operator of the vehicle desires the gear $G_2$ (e.g. one of the remaining low and high gears). In the second position, the piston 40 is not engaged with the first biasing mechanism 60 and the movable member 64 is urged against the abutment 68 by the pre-loaded biasing force $F_1$ of the biasing element 62. The second position may be achieved by exhausting the second fluid 16 from and depressurizing the second chamber

54, while causing the first fluid 18 to flow into and pressurizing the first chamber 52. A pressure difference between the exhausted second chamber 54 and the pressurized first chamber 52 will overcome the biasing force $F_2$ of the biasing element 72, to impart a net force on the piston 40 that urges the piston 40 to a retracted state. As a result, the biasing element 72 of the second biasing mechanism 70 is caused to compress. In an embodiment, the second end 45 of the piston 40 may contact the second axial inner surface 49 of the housing 12 to provide a hard linear stop at an opposite second end of the range of linear translation. In certain embodiments, the second end 45 of the piston 40 may abut the second axial inner surface 49 of the housing 12 prior to the biasing element 72 reaching a maximum compression state.

In regards to FIG. 1C, the piston 40 may also be urged towards a center of the housing 12 and into the intermediate third position along the working-axis 42. In certain applications, the intermediate third position of the piston 40 is selected when the operator of the vehicle does not desire the gears $G_1$, $G_2$ (e.g. the low and high gears), but the neutral operation of the vehicle.

In certain embodiments, the intermediate third position along the working-axis 42 may be achieved by pressurizing the first chamber 52 with the first fluid 18, while simultaneously pressurizing the second chamber 54 with the second fluid 20. In other embodiments, the intermediate third position along the working-axis 42 may be achieved by depressurizing the first chamber 52 and exhausting the first fluid 18, while simultaneously depressurizing the second chamber 54 and exhausting the second fluid 20. In such embodiments, the pressure difference between the first and second chambers 52, 54 may result in a net force being applied to the piston 40 that does not overcome the pre-loaded biasing force $F_1$ of the biasing element 62 disposed between the movable member 64 and the housing 12. For example, a pressure in each of the first and second chambers 52, 54 may be relatively equal and the pressure difference therebetween may be relatively minimal (e.g. zero).

As shown in FIG. 1C, the net force on the piston 40 may be substantially offset by the pre-loaded biasing force $F_1$ of the biasing element 62 once the piston 40 contacts or engages the biasing mechanism 60. In an embodiment, the pre-loaded biasing force $F_1$ of the biasing element 62 causes the movable member 64 to abut both the piston 40 and the abutment 68, while the pre-loaded biasing force $F_2$ of the biasing element 72 causes the piston 40 to be positionally maintained against the movable member 64 over a range of net forces.

Figure 2A:
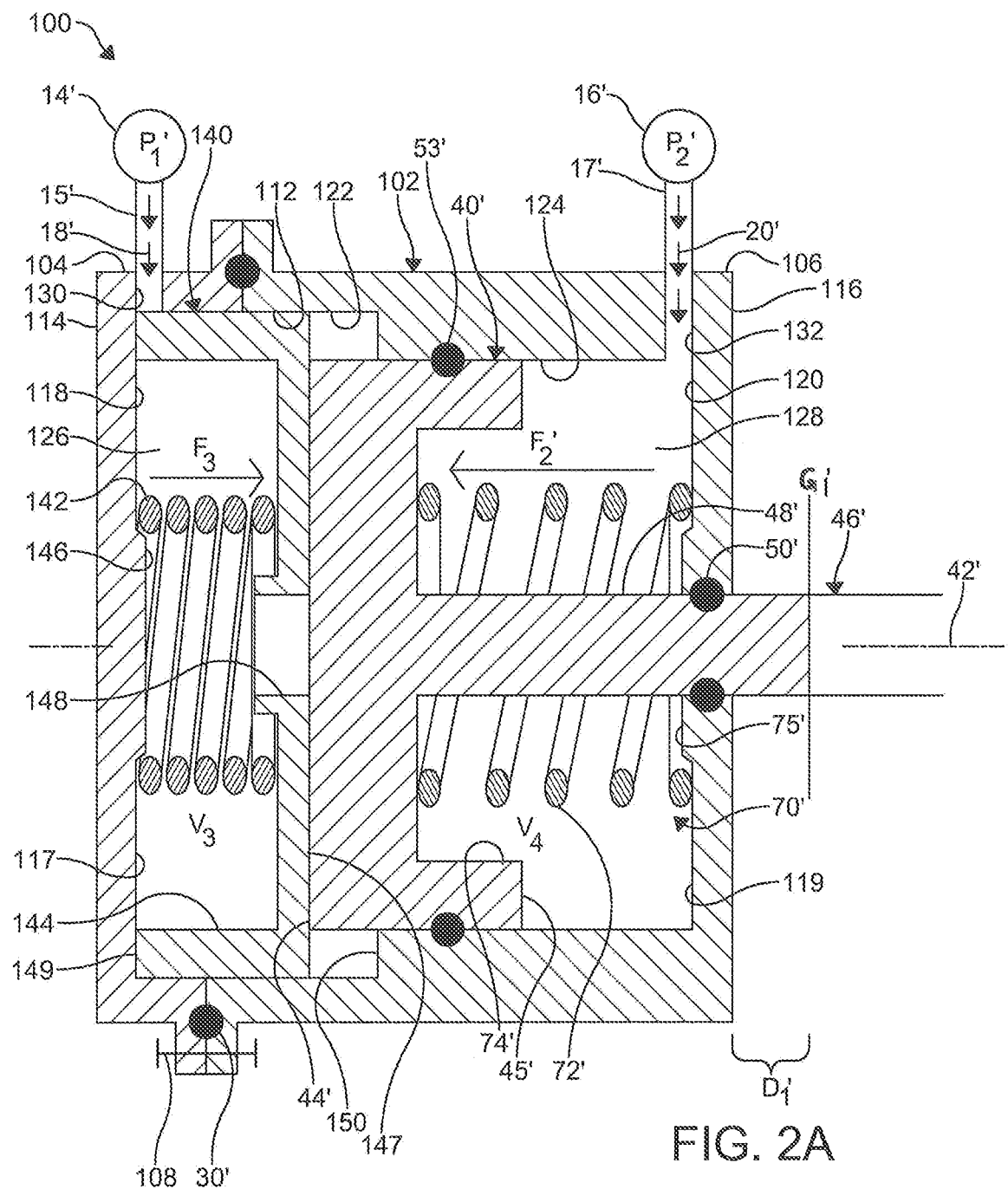
FIG. 2A is a schematic section view of an actuator assembly according to another embodiment of the present disclosure, showing an actuator of the actuator assembly in a first position.
Figure 2B:
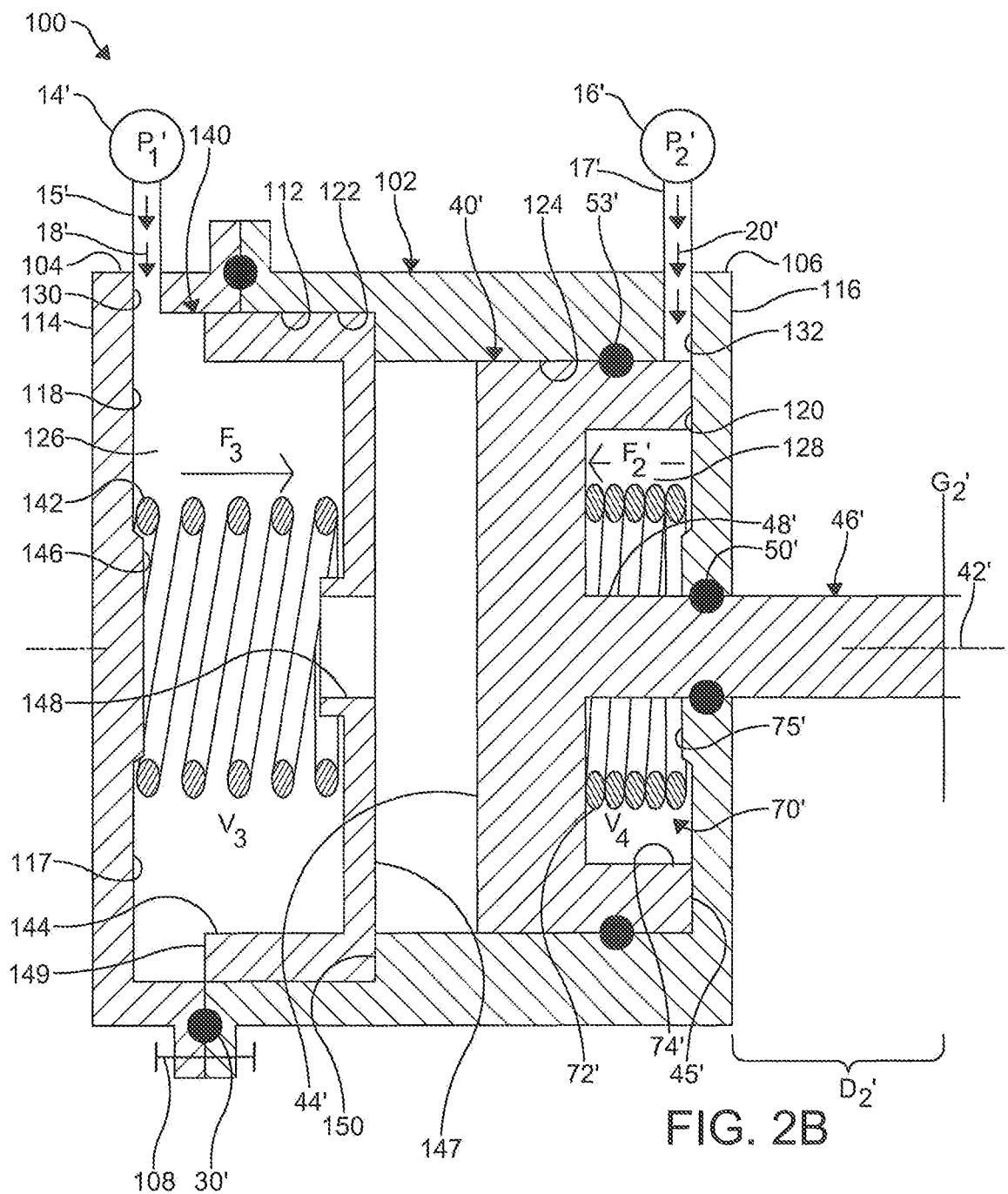
FIG. 2B is a schematic section view of the actuator assembly of FIG. 2A, showing the actuator of the actuator assembly in a second position.
Figure 2C:
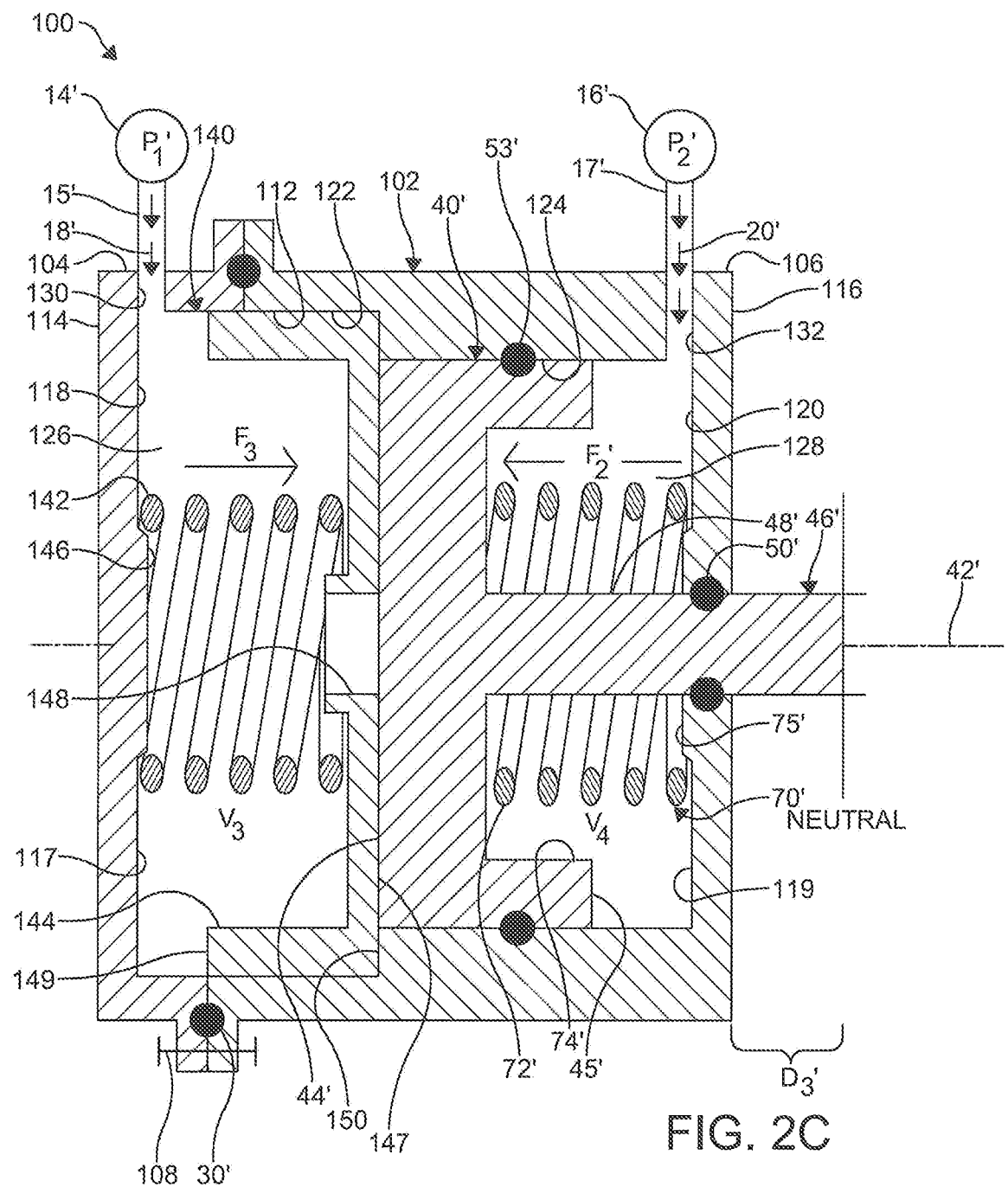
FIG. 2C is a schematic section view of the actuator assembly of FIGS. 2A-2B, showing the actuator of the actuator assembly in an intermediate third position between the first position and the second position thereof.

FIGS. 2A-2C illustrate another embodiment of an actuator assembly 100. The embodiment shown in FIGS. 2A-2C has many items in common with that of FIGS. 1A-1C, and to avoid unnecessary repetition of the description, the same reference numerals with a prime symbol (') have been used for substantially similar structure.

The actuator assembly 100 includes a generally cylindrical housing 102. The housing 102 is in fluid communication with a first fluid source 14' through a passageway 15' formed therein. Similarly, the housing 102 is in fluid communication with a second fluid source 16' through a passageway 17' formed therein. The housing 102 is configured to receive a pressurized first fluid 18' from the first fluid source 14' and a pressurized second fluid 20' from the second fluid source 16' therein. The first fluid 18' has a pressure $P_1'$ and the second fluid has a pressure $P_2'$. It is understood that the first and second fluids 18', 20' can be any type of fluid as desired such as air, oil, and the like, for example. It is further understood that the first and second fluids 18', 20' can be the same or different types of fluid if desired.

As shown, the housing 102 may be formed from a first housing portion 104 coupled with a second housing portion 106. Various methods of coupling the housing portions 104, 106 together can be employed, if desired. For example, the housing portions 104, 106 can be coupled together by mechanical fasteners 108 (e.g. screws, nuts and bolts, rivets, etc.), liquid fasteners (e.g. epoxy, etc.), a joining or coupling process (e.g. welding), and the like. At least one sealing member 30' may be disposed between the housing portions 104, 106 to militate against leakage of the first and second fluids 18', 20' from the housing 102. Various types of sealing members may be employed for the at least one sealing member 30' as desired such as an O-ring, and the like, for example.

A center bore 112 is formed in the housing 102 extending axially from a first end 114 of the housing 102 to a second end 116 thereof. In certain embodiments, the first end 114 of the housing 102 has a first axial inner surface 117, and the second end 116 of the housing 102 has a second axial inner surface 119. The center bore 112 shown is divided into a first cavity 118 and a second cavity 120. Each of the first and second cavities 118, 120 has a generally uniform diameter and substantially smooth radial inner surfaces 122, 124, respectively. In certain embodiments, however, a diameter of the first cavity 118 is larger than a diameter of the second cavity 120.

A piston 40' is also at least partially disposed within the center bore 102 of the housing 12'. The piston 40' includes a first end 44' and a second end 45'. The piston 40' may be configured to linearly translate within the center bore 112 along a working-axis 42'. In an embodiment, the piston 40' is configured to linearly translate among a first position, a second position, and an intermediate third position between the first and second positions, as sequentially demonstrated in FIGS. 2A-2C. In certain applications, the piston 40' is configured to linearly translate within the center bore 112 to achieve desired gear range selections of a vehicle, where the first position of the piston 40' corresponds to a gear $G_1'$ (e.g. one of a low gear and a high gear), the second position of the piston 40' corresponds a gear $G_2'$ (e.g. a remaining one of the low and high gears), and the intermediate third position corresponds to a neutral operation of the vehicle.

The piston 40' may be coupled with an actuator 46' either directly, or through one or more intermediate components. In the embodiment shown, the piston 40' includes an actuating member 48' to facilitate coupling to the actuator 46'. The actuating member 48' may extend axially outwardly from the second end 45' of the piston 40' through the second housing portion 106 and may be configured to interface with one or more external systems. In certain applications, the actuating member 48' is coupled to a transfer case gear controller (not depicted) to select a desired one of the gears $G_1'$, $G_2'$ (e.g. one of the low and high gears) or the neutral operation of the vehicle. As illustrated, at least one sealing member 50' is interposed between the actuating member 48' and the second housing portion 106 to militate against leakage of the first and second fluids 18', 20' from the housing 102. Various types of sealing members may be employed for the at least one sealing member 50' as desired such as an O-ring, and the like, for example.

In certain embodiments, an extension of the actuating member 48' from the housing 102 may vary based on the position of the piston 40'. For example, as shown in FIG. 2A, when the piston 40' is the first position along the working-axis 42', the actuating member 48' may extend a first distance $D_1'$ from the housing 102. Likewise, when the piston 40' moves to the second position or the third position along the working-axis 42', as respectively and sequentially shown by FIGS. 2B and 2C, the extension of the actuating member 48' from the housing 102 may correspondingly increase to a second distance $D_2'$ and a third distance $D_3'$.

As more clearly illustrated in FIG. 2C, the piston 40' may divide the center bore 112 into a first chamber 126 and a second chamber 128 within the housing 102. At least one sealing member 53' is disposed between an outer surface of the piston 40' and the radial inner surface 124 of the second cavity 120 to militate against leakage of the first fluid 18' from the first chamber 126 into the second chamber 128, and leakage of the second fluid 20' from the second chamber 128 into the first chamber 126. Various types of sealing members may be employed for the at least one sealing member 53' as desired such as an O-ring, and the like, for example.

In certain embodiments, a volume $V_3$ of the first chamber 126 and a volume $V_4$ of the second chamber 128 are dependent upon the position of piston 40' in the housing 102. As illustrated in FIG. 2A, the volume $V_3$ of the first chamber 126 may decrease and the volume $V_4$ of the second chamber 128 may increase as the piston 40' translates towards the first position. Contrarily, the volume $V_3$ of the first chamber 126 may increase and the volume $V_4$ of the second chamber 128 may decrease as the piston 40' translates towards the second position as shown in FIG. 2B.

The first chamber 126 is in fluid communication with the first fluid source 14' via an aperture 130 formed in the housing 102, which is fluidly connected to the passageway 15'. Similarly, the second chamber 128 is in fluid communication with the second fluid source 16' via an aperture 132 formed in the housing 102, which is fluidly connected to the passageway 17'. The apertures 130, 132 may allow the first and second fluids 18', 20', respectively, to controllably flow into or out of the first and second chambers 126, 128, respectively, in a manner that may be used to manipulate the position of the piston 40' along the working-axis 42'.

The actuator assembly 100 may further include a first biasing mechanism 140 disposed in the first chamber 126 of the housing 102. The first biasing mechanism 140 is configured to engage the piston 40' while the piston 40' translates between the first position and the intermediate third position. In certain embodiments, the first biasing mechanism 140 includes a biasing element 142 (e.g. a spring, etc.) and a movable member 144. The biasing element 142 may be positioned between the first end 114 of the housing 102 and the movable member 144. As shown, the first end 114 of the housing 102 may include a seat 146 formed thereon to receive the biasing element 142. The biasing element 142 may be pre-loaded with a predetermined biasing force $F_3$ that may cause the movable member 144 to be urged against the piston 40' while the piston 40' translates between the first position and the intermediate third position.

As shown, the movable member 144 is generally disc-shaped. The movable member 144 includes a first portion 147 having a central aperture 148 formed therein, and an opposite second portion 149. The movable member 144 is sized so that an outer peripheral surface thereof is in slidable contact with the radial inner surface 122 of the first cavity 118 of the center bore 112. It should be appreciated, however, that the movable member 144 can have any size and shape as desired. The movable member 144 is configured to linearly translate along the working-axis 42' and provide a substantially uniform surface to engage the piston 40' while the piston 40' translates between the first position and the intermediate third position.

In regards to FIGS. 2A-2C, the actuator assembly 100 further includes an abutment 150. The abutment 150 may be any type of a linear stop against which the movable member 144 abuts when the piston 40' is not in engagement therewith. In the embodiment shown, the abutment 150 is a shoulder formed as a result of a difference in the diameters of the first and second cavities 118, 120 of the center bore 112. It is understood that the abutment 150 can be integrally formed with the housing 102 or be formed as a separate and distinct component, if desired. As more clearly illustrated in FIGS. 2B-2C, the predetermined biasing force $F_3$ of the biasing element 142 also causes the movable member 144 to be urged against the abutment 150 while the piston 40' translates between the intermediate third position and the second position.

The actuator assembly 100 may further include a second biasing mechanism 70' disposed in the second chamber 128 of the housing 102. The second biasing mechanism 70' is configured to engage the piston 40' while the piston 40' translates amongst the first, second, and intermediate third positions. In certain embodiments, the second biasing mechanism 70' includes a biasing element 72' (e.g. a spring, etc.). The biasing element 72' may be pre-loaded with a predetermined biasing force $F_2'$. In certain embodiments, the biasing force $F_2'$ of the biasing element 72' is less than the biasing force $F_3$ of the biasing element 142. The biasing element 72' may cause the piston 40' to be urged against the movable member 144 while the piston 40' translates between the first position and the intermediate third position.

In operation, the piston 40' may be urged towards the first end 114 of the housing 102 and into the first position along the working-axis 42', as illustrated in FIG. 2A. More particularly, the first end 44' of the piston 40' is caused to contact the first portion 147 of the movable member 144. In certain applications, the first position of the piston 40' is selected when an operator of the vehicle desires the gear (e.g. one of the low and high gears). The first position of the piston 40' is achieved by exhausting the first fluid 18' from and depressurizing the first chamber 126, while causing the second fluid 20' to flow into and pressurizing the second chamber 128. In an embodiment, a pressure difference between the exhausted first chamber 126 and the pressurized second chamber 128 will impart a net force on the piston 40' that overcomes any pre-loaded biasing force $F_3$ of the biasing element 142 disposed between the movable member 144 and the housing 102. As a result, the biasing element 142 of the first biasing mechanism 140 is caused to compress and the biasing element 72' of the second biasing mechanism 70' is caused to elongate.

In an embodiment, the second portion 149 of the movable member 144 may contact the first axial inner surface 117 of the housing 102 to provide a hard linear stop at a first end of a range of linear translation. In certain embodiments, the second portion 149 of the movable member 144 may abut the first axial inner surface 117 of the housing 102 prior to the biasing element 142 reaching a maximum compression state.

As illustrated in FIG. 2B, the piston 40' may also be urged towards the second end 116 of the housing 102 and into the second position along the working-axis 42'. In certain applications, the second position of the piston 40' is selected when the operator of the vehicle desires the gear $G_2'$ (e.g. one of the remaining low and high gears). In the second position, the piston 40' is not engaged with the first biasing mechanism 140 and the movable member 144 is urged against the abutment 150 by the pre-loaded biasing force $F_3$ of the biasing element 142. The second position may be achieved by exhausting the second fluid 20' from and depressurizing the second chamber 128, while causing the first fluid 18' to flow into and pressurizing the first chamber 126. A pressure difference between the exhausted second chamber 128 and the pressurized first chamber 126 will overcome the biasing force $F_2'$ of the biasing element 72', to impart a net force on the piston 40' that urges the piston 40' to a retracted state. As a result, the biasing element 72' of the second biasing mechanism 70' is caused to compress. In an embodiment, the second end 45' of the piston 40' may contact the second axial inner surface 119 of the housing 102 to provide a hard linear stop at an opposite second end of the range of linear translation. In certain embodiments, the second end 45' of the piston 40' may abut the second axial inner surface 119 of the housing 102 prior to the biasing element 72' reaching a maximum compression state.

In regards to FIG. 2C, the piston 40' may also be urged towards a center of the housing 12' and into the intermediate third position along the working-axis 42'. In certain applications, the intermediate third position of the piston 40' is selected when the operator of the vehicle does not desire the gears $G_1'$, $G_2'$ (e.g. the low and high gears), but the neutral operation of the vehicle.

In certain embodiments, the intermediate third position along the working-axis 42' may be achieved by pressurizing the first chamber 126 with the first fluid 18', while simultaneously pressurizing the second chamber 128 with the second fluid 20'. In other embodiments, the intermediate third position along the working-axis 42' may be achieved by depressurizing the first chamber 126 and exhausting the first fluid 18', while simultaneously depressurizing the second chamber 128 and exhausting the second fluid 20'. In such embodiments, the pressure difference between the first and second chambers 126, 128 may result in a net force being applied to the piston 40' that does not overcome the pre-loaded biasing force $F_3$ of the biasing element 142 disposed between the movable member 144 and the housing 102. For example, a pressure in each of the first and second chambers 126, 128 may be relatively equal and the pressure difference therebetween may be relatively minimal (e.g. zero).

As shown in FIG. 2C, the net force on the piston 40' may be substantially offset by the pre-loaded biasing force $F_3$ of the biasing element 142 once the piston 40' contacts or engages the biasing mechanism 140. In an embodiment, the pre-loaded biasing force $F_3$ of the biasing element 142 causes the movable member 144 to abut both the piston 40' and the abutment 150, while the pre-loaded biasing force $F_2'$ of the biasing element 72' causes the piston 40' to be positionally maintained against the movable member 144 over a range of net forces.

In accordance with the provisions of the patent statutes, the present disclosure of the subject matter has been described in what is considered to represent its preferred embodiments. However, it should be noted that the subject matter can be practiced otherwise than as specifically illustrated and described without departing from its spirit or scope.

What is claimed:

1. An actuator assembly, comprising:
   a housing having a center bore formed therein, a first inner surface, and a second inner surface opposite the first inner surface;
   a first biasing mechanism extending from the first inner surface of the housing;
   a second biasing mechanism extending from the second inner surface of the housing; and
   a solid piston at least partially disposed in the housing, wherein the piston
   includes a first end facing the first inner surface of the housing and a second end facing the second inner surface of the housing, and is selectively positionable between a first position within which the first end of the piston is urged toward the first inner surface of the housing, a second position within which the second end of the piston is urged toward the second inner surface of the housing, and an intermediate position between the first position and the second position, and wherein the first end of the piston contacts the first biasing mechanism when the piston is in the first position, and the second end of the piston includes an actuating member extending outwardly away from the first biasing mechanism, wherein the first end of the piston is spaced apart from the first biasing mechanism when the piston is in the second position, and wherein the second end of the piston contacts the second biasing mechanism when the piston is in the first position, the second position, and the intermediate position.

2. The actuator assembly of claim 1, wherein the first biasing mechanism includes a biasing element and a movable member.

3. The actuator assembly of claim 2, wherein at least a portion of the first biasing mechanism is disposed about a stem portion formed within the housing.

4. The actuator assembly of claim 2, wherein the movable member of the first biasing mechanism is a generally disc-shaped.

5. The actuator assembly of claim 2, further comprising a linear stop against which the movable member abuts when the piston is not in engagement therewith.

6. The actuator assembly of claim 5, wherein the linear stop is disposed on a stem portion formed within the housing.

7. The actuator assembly of claim 1, wherein a biasing force of the first biasing mechanism is greater than a biasing force of the second biasing mechanism.

8. The actuator assembly of claim 1, wherein the center bore includes a first cavity and a second cavity formed therein.

9. The actuator assembly of claim 8, wherein a diameter of the first cavity is larger than a diameter of the second cavity forming a shoulder therebetween.

10. The actuator assembly of claim 9, wherein the shoulder comprises a linear stop against which at least a portion of the first biasing mechanism abuts when the piston is not in engagement therewith.

11. The actuator assembly of claim 1, wherein the piston divides the housing into a first chamber and a second chamber.

12. The actuator assembly of claim 11, wherein the first chamber is in fluid communication with a first fluid source and the second chamber is in fluid communication with a second fluid source.

13. The actuator assembly of claim 11, wherein the first chamber includes the first biasing mechanism disposed therein and the second chamber includes the second biasing mechanism disposed therein.

14. The actuator assembly of claim 11, further comprising a sealing member disposed about the piston, wherein the sealing member militates against a flow of at least one fluid directly from one of the first chamber and the second chamber into a remaining one of the first chamber and the second chamber.

15. The actuator assembly of claim 1, wherein the first position of the piston is configured to engage one of a low gear of a vehicle and a high gear of the vehicle, the second position of the piston is configured to engage a remaining one of the low gear of the vehicle and the high gear of the vehicle, and the intermediate position of the piston is configured to disengage the low gear and the high gear and permit a neutral operation of the vehicle.

16. The actuator assembly of claim 1, wherein the housing is a sealed housing having only a first fluid conduit, a second fluid conduit, and an opening formed therein, and wherein the opening is configured to receive the actuating member of the piston therethrough.

17. An actuator assembly, comprising:
a housing having a first inner surface and a second inner surface opposite the first inner surface; and
a one-piece solid piston at least partially disposed in the housing, wherein
the piston divides the housing into a first chamber and a second chamber, wherein the first chamber includes a first biasing mechanism extending from the first inner surface of the housing, and wherein the second chamber includes a second biasing mechanism extending from the second inner surface of the housing,
wherein the piston includes a first end facing the first inner surface of the housing and a second end facing the second inner surface of the housing, and is selectively positionable between a first position within which the first end of the piston is urged toward the first inner surface of the housing, a second position within which the second end of the piston is urged toward the second inner surface of the housing, and an intermediate position between the first position and the second position, and wherein the first end of the piston contacts the first biasing mechanism when the piston is in the first position, and the second end of the piston includes an actuating member extending outwardly away from the first biasing mechanism, wherein the first end of the piston is spaced apart from the first biasing mechanism when the piston is in the second position, and wherein the second end of the piston contacts the second biasing mechanism when the piston is in the first position, the second position, and the intermediate position.

18. The actuator assembly of claim 17, wherein the first chamber is substantially fluid-tight.

19. The actuator assembly of claim 17, wherein the second chamber is substantially fluid-tight.

20. An actuator assembly, comprising:
a housing having a first inner surface and a second inner surface opposite the first inner surface;
a one-piece solid piston at least partially disposed in the housing, wherein
the piston divides the housing into a first chamber and a second chamber, and wherein the first chamber has a first biasing mechanism extending from the first inner surface of the housing and the second chamber has a second biasing mechanism extending from the second inner surface of the housing; and
a sealing member disposed about the piston, wherein the sealing member
militates against a flow of at least one fluid directly from one of the first chamber and the second chamber into a remaining one of the first chamber and the second chamber,
wherein the piston includes a first end facing the first inner surface of the housing and a second end facing the second inner surface of the housing, and is selectively positionable between a first position within which the first end of the piston is urged toward the first inner surface of the housing, a second position within which the second end of the piston is urged toward the second inner surface of the housing, and an intermediate position between the first position and the second position, and wherein the first end of the piston contacts the first biasing mechanism when the piston is in the first position, and the second end of the piston includes an actuating member extending outwardly away from the first biasing mechanism, wherein the first end of the piston is spaced apart from the first biasing mechanism when the piston is in the second position, and wherein the second end of the piston contacts the second biasing mechanism when the piston is in the first position, the second position, and the intermediate position.

* * * * *